United States Patent [19]
Gelan et al.

[11] Patent Number: 5,917,003
[45] Date of Patent: *Jun. 29, 1999

[54] PROCESS FOR PRODUCING POLYMERS OF α,ω-UNSATURATED CONJUGATED COMPOUNDS, AND HIGH MOLECULAR WEIGHT CONJUGATED POLYMERS THUS OBTAINABLE

[75] Inventors: Joanes Gelan, Genk; Dirk Vanderzande, Nieuwerkerken; Frank Louwet, Diepenbeek, all of Belgium

[73] Assignee: Hoechst Aktiengesellschaft, Frankfurt, Germany

[ * ] Notice: This patent is subject to a terminal disclaimer.

[21] Appl. No.: 08/304,134

[22] Filed: Sep. 12, 1994

[30] Foreign Application Priority Data

Sep. 14, 1993 [EP] European Pat. Off. ............. 93114780

[51] Int. Cl.$^6$ ..................................................... C08G 69/08
[52] U.S. Cl. ......................... 528/330; 528/331; 525/535; 526/89; 526/210; 526/217; 526/222
[58] Field of Search .................................... 528/330, 331; 525/535; 526/89, 210, 217, 222

[56] References Cited

U.S. PATENT DOCUMENTS

| | | | |
|---|---|---|---|
| 3,346,514 | 10/1967 | Isaacson et al. | |
| 4,808,681 | 2/1989 | Harper et al. | |
| 5,364,522 | 11/1994 | Wang | 205/50 |

FOREIGN PATENT DOCUMENTS

| | | |
|---|---|---|
| 0182548 | 5/1986 | European Pat. Off. |
| 0443861 | 8/1991 | European Pat. Off. |
| WO 90/13148 | 11/1990 | WIPO |

OTHER PUBLICATIONS

Journal of Polymer Science, pp. 55–66, 1985 entitled "The Polymerization of Xylyene Bisdialkyl Sulfonium Salts" by R.A. Wessling.

Journal of Polymer Science: Part A–1: vol. 4, 1337–1349, 1966 entitled Polymerization of α–Halogenated p–Xylenes with Base by Gilch et al.

Journal of Polymer Science: Part A: Polymer Chemistry, vol. 26, 3241–3249, 1988 entitled "Preparation of Polyphenylene Vinylene) from Cycloalkylene Sulfonium Salt Monomers and Polymers" by Lenz et al.

Polymer, 1993, vol. 34, No. 6, pp. 1282–1288 entitled "Reactions proceeding via the reactive intermediate α–vinyl–p–xylylene. Contrasting orientations in the formation of cyclic dimers and polymer" by Brooke et al.

Die Makromolekulare Chemie 131 (1970) pp. 105–132 (No. 3096), entitled "Poly–p–xylyliden" by Hörhold et al.

Polymer, 1992, vol. 33, No. 15 entitled "Highly conductive cyrstalline poly (2–methoxy–p–phenylene vinylene)" by Liang et al.

Primary Examiner—Duc Truong
Attorney, Agent, or Firm—Frommer Lawrence & Haug LLP

[57] ABSTRACT

A process for producing polymers of α, ω-unsaturated conjugated compounds, which includes reacting a compound of the formula (I),

B—A—C       (I)

wherein

B denotes a sp$^3$-hybridized carbon atom carrying at least one hydrogen atom,

A denotes a conjugated-π-system or a —CH═CH— group, and

C denotes a carbon atom carrying at least one leaving group, with a base in a solvent. On reaction of the base with the compound of the formula (I) a polymer is formed as a by-product essentially soluble in the solvent and a solid is formed as a by-product which is essentially insoluble in the solvent. According to the process, chemically and thermally stable, high molecular weight polymers of high purity and high regularity are obtained in good yield. If the products of the process carry groups that undergo elimination, forming double bonds, high quality electroluminescent materials can be prepared.

9 Claims, No Drawings

PROCESS FOR PRODUCING POLYMERS OF α,ω-UNSATURATED CONJUGATED COMPOUNDS, AND HIGH MOLECULAR WEIGHT CONJUGATED POLYMERS THUS OBTAINABLE

A process for producing polymers of α,ω-unsaturated conjugated compounds, and high molecular weight conjugated polymers thus obtainable The present invention relates to a process for producing polymers of α,ω-unsaturated conjugated compounds, in particular of compounds which contain aromatic ring systems. It also relates to high molecular weight polymers obtainable by said process, to high molecular weight conjugated polymers and to electroluminescent devices comprising such polymers. There is an urgent industrial need for large-area solid-state light sources, for a wide range of applications mostly related to display technologies, and there is no fully satisfactory technology at present. Polymer-based electroluminescent devices are very promising and they offer several advantages over conventional, inorganic light-emitting diodes and liquid-crystal displays. These advantages include the availability of the whole color spectrum, the ability to make large area electroluminescent devices, the ability to make flexible displays, and the high brightness of the luminescence. This is combined with simple processing technology and low fabrication costs. Furthermore, displays of this type do not need backlighting, in contrast to liquid-crystal displays.

Polymer-based electroluminescent devices are described, e.g., in WO 90/13 148 and EP-A 0 443 861.

A typical device as described in WO 90/13 148 is made up of a semiconductor layer in the form of a thin dense polymer film comprising at least one conjugated polymer, a first contact layer in contact with a first surface of the semiconductor layer, and a second contact layer in contact with a second surface of the semiconductor layer, wherein the polymer film of the semiconductor layer has a sufficiently low concentration of extrinsic charge carriers that on applying an electric field between the first and second contact layers across the semiconductor layer so as to render the second contact layer positive relative to the first contact layer charge carriers are injected into the semiconductor layer and radiation is emitted from the semiconductor layer.

The polymer employed as a semiconductor layer in these devices is conjugated.

By conjugated polymer is meant a polymer which possesses a delocalized π-electron system along the polymer backbone; the delocalized π-electron system confers semiconducting properties to the polymer and gives it the ability to support positive and/or negative charge carriers with high mobilities. Such polymers are discussed, for example, by R. H. Friend in J. Mol. Elec. 4, (1988) 37.

Poly(p-phenylene vinylene) [PPV] is utilized as a charge conducting layer in WO 90/13 148, and it is suggested in this document to have substituents on the phenylene ring or to replace phenylene with a fused carbocyclic system or a heterocyclic system. Conductive layers made of poly (aniline) [PAn] and poly(2,5-thienylene vinylene) [PTV] are described in EP-A 0 443 861.

Highly conjugated polymers, such as PPV or PTV, are generally insoluble and infusible because of the stiffness of their backbone. Consequently they are difficult to process. A solution to this problem is their synthesis via soluble precursor polymers or the use of specifically substituted monomers which lead to soluble, specifically sidechain-substituted conjugated polymers.

The synthesis via precursor polymers proceeds, for example, according to the so-called Wessling bis-(sulphonium salt) precursor route (R. A. Wessling, J. Polym. Sci., Polym. Symp. 72, (1985) 55.). For example, PPV precursor polymers can be prepared by treating an α,α'-bis (sulfonium chloride)-p-xylene, e.g., α,α'-bis (tetrahydrothiophenium chloride)-p-xylene, with NaOH in water or alcohols as a solvent to yield a sulphonium polyelectrolyte. This precursor polymer is soluble and can be processed, e.g. by spin-coating or film-casting. On heating the precursor polymer, PPV is formed by elimination of tetrahydrothiophene and HCl. Although this is a versatile method for the preparation of a wide range of poly(arylene vinylenes) there are two major drawbacks. Firstly, the polyelectrolyte nature of the precursor makes filtration of the precursor solutions difficult or even imposible. This is a severe restriction for all applications were small insoluble particles, like dust, have to be avoided, e.g. for electroluminescent devices. Secondly, the precursor polymers are thermally and chemically unstable. They have to be stored well below zero degree centigrade to prevent partial elimination leading to an insoluble polymer comprising considerable conjugated segments and they are susceptible to substitution reactions, in particular with the commonly used solvents water and methanol.

The mechanism of the formation of the precursor polymer is believed to proceed via an in situ generation of a true monomer, a p-quinodimethane system. Polymerization reactions of p-quinodimethane systems are well known in the literature (e.g., H. G. Gilch and W. L. Wheelwright, J. Polym. Sci. Al 4, (1966) 1337; R. W. Lenz et al, J. Polym. Sci., Polym. Chem. 26, (1988) 3241; G. M. Brooke and M. F. Woolley, Polymer 34, (1993) 1282).

Specifically substituted monomers which lead to specific sidechain-substituted conjugated polymers have been used to prepare processable conjugated polymers via a dehydrochlorination reaction with a 1,4-bis(halogenomethyl) benzene as monomer. For example, the preparation of poly (2-methoxy-5 (2'-ethyl-hexyloxy)-p-phenylene vinylene) from 2,5-bis(chloromethyl)-1-methoxy-4-(2'-ethyl-hexyloxy)benzene is described in U.S. Pat. No. 5,189,136. Another example is the preparation of poly(2,5-di-n-hexyloxy-p-phenylene vinylene) (W. J. Swatos et al., Polymer Prepr. 31(1), (1990) 505). However, the use of the dehydrohalogenation reaction for the preparation of processable conjugated polymers or precursor polymers thereof is limited to specific compounds, since otherwise insoluble and infusible materials are obtained (see for instance H. H. Horhold and J. Opfermann, Makromol. Chem. 131, (1970) 105).

It is known (see for instance W. B. Liang, M. Masse and F. Karasz, Polymer 33, (1992) 3101) that in the synthesis according to Wessling the yield improves and the resulting polymer has a higher molecular weight if an apolar solvent, e.g. hexane, is added to the aqueous reaction mixture.

There have been attempts to generalize the precursor-route (see, e.g., F. Louwet, D. Vanderzande and J. Gelan, Synth. Met. 52, (1992) 125) or to adapt it to the synthesis of poly(2,5-heteroarylene vinylenes) (see, e.g., H. J. Geise et al., Synth. Met. 51, (1992) 329).

However, up to now the materials prepared by these processes have not been fully satisfactory with respect to molecular weight, chemical and thermal stability and processability. A high molecular weight is necessary if the polymers are to have good film forming properties and mechanical stability, and to minimize the end-group concentration, since end-groups are likely to influence adversely properties like electroluminescence.

There is clearly room for improvement of the synthesis of PPV and related compounds.

As there is also a steady demand to develop new materials for use in electroluminescent devices, it was highly desirable to find a general synthetic route to such polymers.

Surprisingly, it has now been found that high molecular weight precursor polymers which are chemically and thermally stable are obtainable in good yields if the formation of the actual monomer, i.e., the p-xylylene or a derivative thereof, is carried out in specific solvents and is accompanied by the formation of a solid that is essentially insoluble in the reaction medium, and the monomer and polymer are soluble in the reaction medium; if extremely high molecular weights are reached, some precipitation of the high molecular weight material can occur.

Accordingly, the object of the invention is a process for producing polymers of α,ω-unsaturated conjugated compounds, which comprises reacting a compound of the formula (I), $$B-A-C \qquad (I)$$

wherein
B denotes a sp³-hybridized carbon atom carrying at least one hydrogen atom,
A denotes a conjugated-π-system or a —CH=CH— group, and
C denotes a carbon atom carrying at least one leaving group, with a base in a solvent, characterized in that on reaction of the base with the compound of the formula (I) a polymer is formed which is essentially soluble in said solvent, and a solid is formed as a by-product, which is essentially insoluble in said solvent, and that said solvent comprises a compound selected from the group consisting of a) amides of the general formula (II)

$$R^1-CO-NR^2R^3 \qquad (II)$$

b) urea derivatives of the general formula (III)

$$R^1R^3N-CO-NR^2R^4 \qquad (IV)$$

c) carbonates of the general formula (IV)

$$R^1O-CO-OR^2 \qquad (IV)$$

d) nitroalkanes of the general formula (V)

$$R^6-NO_2 \qquad (V)$$

e) nitriles of the general formula (VI)

$$R^6-CN \qquad (VI)$$

f) amines of the general formula (VII)

$$R^5{}_2-N-R^6 \qquad (VII)$$

g) sulfones of the general formula (VIII)

$$R^6-SO_2-R^6 \qquad (VIII)$$

h) sulfoxides of the general formula (IX)

$$R^6-SO-R^6 \qquad (IX)$$

i) phosphoramides of the general formula (X)

$$((R^6)_2)N)_3-P=O \qquad (X)$$

j) sulfonates of the general formula (XI)

$$R^6-SO_2-O-R^6 \qquad (XI)$$

in which formulae (II) to (XI)
$R^1$, $R^2$, $R^3$, $R^4$ denote, independently of each other, H or a straight chain or branched alkyl group, or $R^1$ and $R^2$ together are —(CH$_2$)$_2$—, —(CH$_2$)$_3$— or —(CH$_2$)$_4$—, and
$R^5$ has the meaning of $R^1$ or is a phenyl group which is unsubstituted or substituted by halogen, methyl and methoxy groups, and
$R^6$ has the meaning of $R^5$, except H.

Essentially soluble means that the polymer is soluble in the solvent up to a high molecular weight, preferably up to a molecular weight of at least $1 \cdot 10^6$ ($M_W$), however, it is understood that if extremely high molecular weights are reached, some precipitation of the extremely high molecular weight material can occur. According to the invention chemically and thermally stable, high molecular weight polymers of high purity and high regularity are obtained in good yield. If the products of the novel process carry groups that undergo elimination to form double bonds, high quality electroluminescent materials can be prepared. The novel process is generally applicable to all kinds of possible starting materials. Both the starting materials and the final products are stable and easy to process. Possible starting materials for the novel process are compounds of the general formula (I), $$B-A-C \qquad (I)$$

wherein
B denotes a sp³-hybridized carbon atom carrying at least one hydrogen atom,
A denotes a conjugated π-system or a —CH=CH— group, and
C denotes a carbon atom carrying at least one electron-accepting group.

In preferred embodiments A comprises an aromatic system or a heteroaromatic system containing nitrogen, sulfur or oxygen.

Preferably the precursor monomer of the general formula (I) has the structure (Ia), $$R^2-\underset{\underset{H}{|}}{\overset{\overset{R^1}{|}}{C}}-A-\underset{\underset{R^4}{|}}{\overset{\overset{L}{|}}{C}}-R^3 \qquad (Ia)$$

wherein
$R^1$, $R^2$, $R^3$, $R^4$ are independently —H, —R⁵, —OR⁵, —COOR⁵, NO$_2$, —NR⁵R⁶, —SR⁵, CN, —SO—R⁵, —SO$_2$—R⁵, —L,
$R^5$, $R^6$ are independently C$_1$–C$_{20}$ alkyl, phenyl, which can be mono- or disubstituted by $R^1$, benzyl, or $R^5$ and $R^6$ together are —(CH$_2$)$_4$— or —(CH$_2$)$_5$—, and
L is Cl, Br, I, —O—Tos, —O—Mes, —O—Triflate, —(NR⁵$_3$)$^⊕$, —(SR⁵R⁶)$^⊕$ or —OOC—R⁵,
A is p-phenylene, 2,6-naphthalenediyl, 1,4-naphthalenediyl, 1,4-anthracenediyl, 2,6- anthracenediyl, 9,10-anthracenediyl, 2,5-thienylene, 2,5-furanediyl, 2,5-pyrroldiyl, 1,3,4-oxadiazol-2,5-diyl, 1,3,4-thiadiazol-2,5-diyl, 1,3-benzo[c]furanediyl, 1,3-benzo[c]pyrroldiyl, 1,3-benzo[c]thienylene, thieno[3,2-b]thiophene-2,5-diyl or pyrrolo[3,2-b]pyrrol-2,5-diyl in which H-atoms on the aromatic rings can be substituted by linear or branched hydrocarbon groups having 1 to 22 carbon atoms, such as methyl, ethyl, propyl, isopropyl, butyl, t-butyl, pentyl, hexyl, heptyl, octyl, lauryl and octadecyl, and electron-donating groups such as linear or branched alkoxy groups having 1 to 22 carbon atoms, eg. methoxy, ethoxy, propoxy, isopropoxy, butoxy, t-butoxy, pentyloxy, hexyloxy, heptyloxy, octyloxy, lauryloxy or octadecyloxy, or halogen atoms or electron-withdrawing groups such as cyano, nitro or ester groups.

Especially preferred aromatic groups A include p-phenylene, mono $C_{1-22}$-alkyl-p-phenylene, mono-$C_{1-22}$-alkoxy-p-phenylene, 2,5-di-$C_{1-22}$-alkyl-p-phenylene, 2,5-di-$C_{1-22}$-alkoxy-p-phenylene, 2,5-thienylene, 3-$C_{1-22}$-alkyl-2,5-thienylene, 2,5-di-$C_{1-22}$-alkoxy-2,5-thienylene, more specifically monomethyl-p-phenylene, monomethoxy-p-phenylene, 2,5-dimethyl-p-phenylene, 2,5-dimethoxy-p-phenylene, monoethyl-p-phenylene, 2,5-diethoxy-p-phenylene, 2,5-diethyl-p-phenylene, monobutyl-p-phenylene, monobutoxy-p-phenylene, 2,5-dibutoxy-p-phenylene, 2,5-diheptyl-p-phenylene, 2,5-diheptyloxy-p-phenylene, 2, 5-dioctyl-p-phenylene, 2,5-dioctyloxy-p-phenylene, 2,5-dilauryl-p-phenylene, 2,5-dilauryloxy-p-phenylene, 2,5-distearyl-p-phenylene, 2,5-distearyloxy-p-phenylene, 2,5-di-t-butoxy-p-phenylene 2,5-dicyano-p-phenylene etc. More preferred are p-phenylene, 2,5-dimethoxy-p-phenylene, 2,5-diethoxy-p-phenylene, 2,5-dibutoxy-p-phenylene, 2,5-diheptyloxy-p-phenylene and 2,5-dilauryloxy-p-phenylene.

Particular preference is also given to precursor monomers of the general formula (Ib),

(Ib)

wherein

A, L, $R^1$, $R^3$ have the meaning given in formula (Ia) in claim 4,

P is —$SR^5$, —$OR^5$, OH, —Cl, —Br, —SO—$R^5$, —$SO_2$—$R^5$, CN or —CO—$OR^5$, and $R^5$ is a straight chain or branched $C_1$ to $C_{12}$ alkyl, phenyl or benzyl.

The following compounds are examples of further preferred precursor monomers

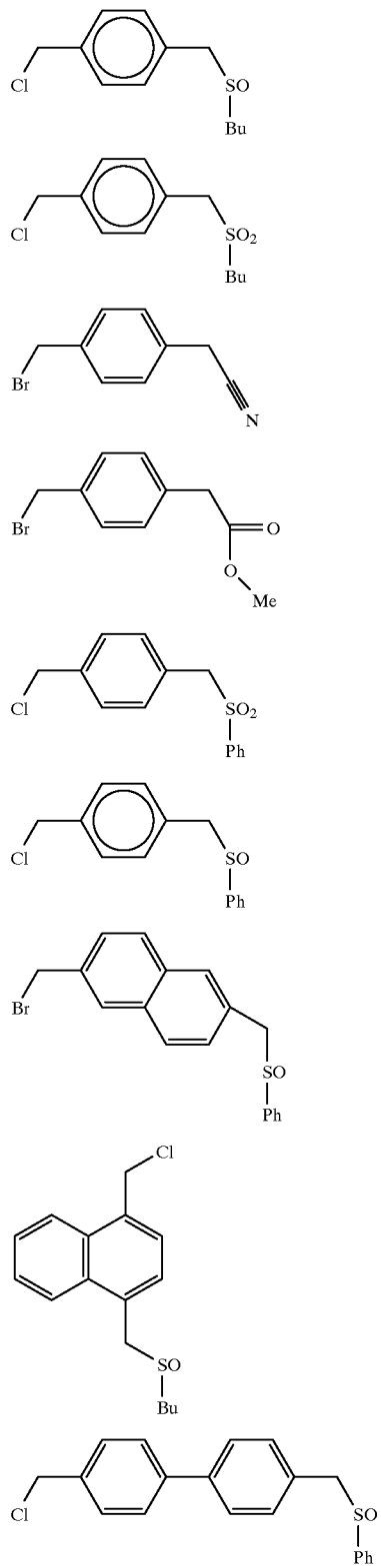

-continued

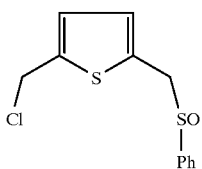
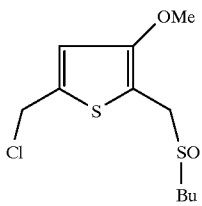
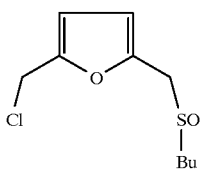
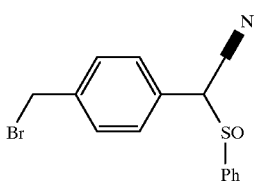
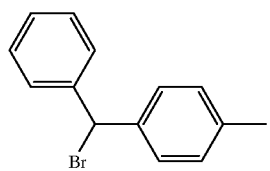

-continued

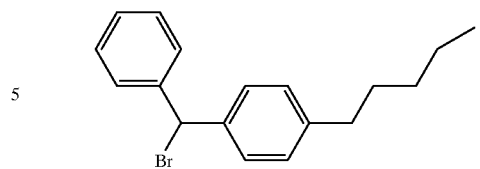
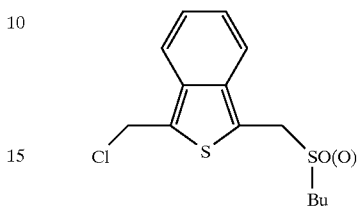
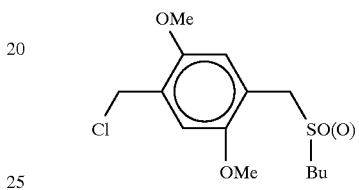

The compounds of the formula (I) are known per se from the literature. Synthesis of these compounds is described, for example, in W. B. Liang et al., J. Polym. Sci., Polym. Chem. 28, (1990) 2867; I. Murase et al., Synth. Met. 17, (1987) 639; R. M. Gregorius et al., Macromolecules 25, (1992) 6664; N. Tsuyoshi, EP 044381 A2, F. R. Denton III et al., J. Polym. Sci., Polym. Chem. 30, (1992) 2233.

It goes without saying that mixtures of different precursor monomers of the formula (I) can also be used, which leads to copolymers.

The precursor monomer of the general formula (I) is reacted with a base to form the actual monomer of the polymerization (scheme 1, steps 2 and 3). Scheme 1

(1)

(2)
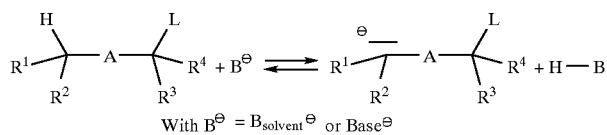

(3)
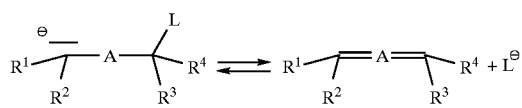

(4)
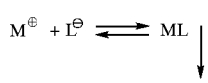

As L⊖ is removed from the equilibrium in step 3 by the precipitation (step 4), the equilibrium is displaced to the right and formation of the monomer is increased. This is important for the synthesis of high molecular weight polymers.

If $pK_A$ (solvent) is smaller than $pK_A$ (base), the equilibrium in step 1 lies to right and the deprotonated solvent acts as the actual base.

In general all kinds of metal bases and ammonium bases can be used; non-charged bases such as amines, like triethylamine or pyridine are also suitable. Classes of metal and ammonium bases are e.g., metal hydrides, such as NaH or KH, metal hydroxides, such as NaOH, LiOH or KOH, metal alkoxides, such as NaOMe or NaOEt, KOtBu, metal amides, such as $NaNH_2$, $NaN(SiMe_3)_2$, lithiumdiisopropylamide (LDA), organometal compounds, such as n-BuLi, Grignard reagents, and ammonium hydroxides.

In polar aprotic solvents it is especially advantageous to use metal hydrides as they show no nucleophilic properties. In polar protic solvents it is preferred to use bases with a $pK_A$ larger than the $pK_A$ of the solvent. In this case the solvent is deprotonated and the deprotonated solvent acts as the actual base. This introduces a base equalizing effect. As a consequence the $M_W$ of the polymer will be independent of the base used. The presence of the relatively weak base also reduces possible polymer degradation.

Generally, the amount of base can vary between 100 and 0.1 equivalents with respect to the monomer precursor. Preferably, 50 to 0.5 equivalents of base with respect to the monomer precursor are used. It is especially preferred to employ 10 to 1 equivalents of base per mol of monomer precursor. An excess of base usually improves polymer yield and molecular weight, especially when the solubility of the monomer precursor is low. In the case of polar aprotic solvents the excess of base is preferably limited to 10 equivalents per mol of monomer precursor in order to avoid excessive degradation of the polymer.

The process of the invention is carried out in a solvent comprising at least one compound selected from the group consisting of a) amides of the general formula (II)

$$R^1\text{—CO—}NR^2R^3 \qquad (II)$$

b) urea derivatives of the general formula (III)

$$R^1R^3N\text{—CO—}NR^2R^4 \qquad (III)$$

c) carbonates of the general formula (IV)

$$R^1O\text{—CO—}OR^2 \qquad (IV)$$

d) nitroalkanes of the general formula (V)

$$R^6\text{—}NO_2 \qquad (V)$$

e) nitriles of the general formula (VI)

$$R^6\text{—CN} \qquad (VI)$$

f) amines of the general formula (VII)

$$R^5{}_2\text{—N—}R^6 \qquad (VII)$$

g) sulfones of the general formula (VII)

$$R^6\text{—}SO_2\text{—}R^6 \qquad (VIII)$$

h) sulfoxides of the general formula (IX)

$$R^6\text{—SO—}R^6 \qquad (IX)$$

i) phosphoramides of the general formula (X)

$$((R^6)_2)N)_3\text{—P=O} \qquad (X)$$

j) sulfonates of the general formula (XI)

$$R^6\text{—}SO_2\text{—O—}R^6 \qquad (XI)$$

in which formulae (II) to (XI)

$R^1$, $R^2$, $R^3$, $R^4$ denote, independently of each other, H or a straight chain or branched alkyl group, or $R^1$ and $R^2$ together are $-(CH_2)_2-$, $-(CH_2)_3-$ or $-(CH_2)_4-$, and $R^5$ has the meaning of $R^1$ or is a phenyl group or a phenyl group substituted by halogen, methyl and methoxy groups, $R^6$ has the meaning of $R^5$, except H.

Preferred solvents are those of the general formula (IIa)

$$R^1\text{—CO—}NHR^2 \qquad (IIa)$$

wherein the symbols have the same meaning as in formula (II).

Particularly preferred examples of compounds of the formulae (II) to (XI) include monomethyl formamide (MMF), imidazolidone, pyrrolidone, 1,3-dimethylimidazolidin-2-one, N,N-dimethyl-1,3-diazixan-2-one, ethylene carbonate, propylene carbonate, nitromethane and nitrobenzene.

It is also possible to use solvent mixtures. It is preferred to use mixtures of the solvents of the formula (II) to (XI) with weakly polar or non-polar aprotic solvents. For example, mixtures of MMF and dichloromethane can be used.

The solvent used should be able to dissolve the precursor monomer, the actual monomer and the polymer. In an aprotic polar solvent the concentration of the initiating species depends on the base strength and the nucleophilic properties of the base used. It is preferable to have a base with low nucleophilic character in these cases.

When carrying out the process of the invention care has to be taken to choose the precursor monomer, base and solvent in such a way that the salt formed in the reaction of the base with the precursor monomer is essentially insoluble in the selected solvent, while the precursor polymer which forms in the reaction is essentially soluble.

This can be easily achieved, e.g., by checking the solubility of the salt in the given solvent in a standard handbook on the physical properties of the chemical compounds, such as H. Stephen and T. Stephen, "Solubilities of Inorganic and Organic Compounds", Pergamon Press (1963).

The precipitation of the salt (ML in scheme 1) from the chosen solvent removes it from the equilibrium (scheme 1 steps 3 and 4) and favors the formation of the actual monomer. For high molecular weights of the polymer the concentrations of the actual monomer should be as high as possible.

This can be achieved by keeping the concentration of ML in the given solvent as low as possible.

To lower the concentration of ML in the solvent one can, e.g., a) add a weakly polar or non-polar protic solvent, like $CH_2Cl_2$,
b) use an excess of base, or
c) add a salt which is soluble in the given solvent and which has the same cation as ML (for instance sodium tosylate can be added if the solvent is MMF and ML is NaCl).

The temperature of the reaction is chosen as a function of the solubility of the precursor monomer, the actual monomer and the polymer. The highest temperature used should be lower then the degradation temperature of the polymer and the temperature at which the solid phase forms a homogeneous phase with the solvent, and the lowest temperature used should be higher than the temperature limit under which there is no formation of the actual monomer (i.e., the quinodimethane system).

The temperature can be chosen to tune the molecular weight, in the sense that higher temperatures lead to lower molecular weights and lower polymer yields as a consequence of a higher solubility of the salt ML at higher temperatures.

In general the reaction is carried out between −78° C. and 200° C., preferably between −40° C. and 120° C., and especially preferably between −20° C. and 30° C.

Usually the reaction is completed within 24 hours, preferably within 8 hours, more preferably within 3 hours.

In general the novel process is carried out in an inert atmosphere, e.g. under nitrogen or argon.

The working up of the polymer forming in the reaction is conducted according to methods well known to anyone skilled in the art. For instance, in the case of polymers that are insoluble in water the polymer can be precipitated by adding water. The crude product which is obtained in this way can be further purified, e.g. by reprecipitation, extraction or dialysis (see for instance B. Vollmert "Grundriss der Makromolekularen Chemie", Bd. II, E. Vollmert-Verlag (1988)).

The product of the novel process is a polymer comprising recurring units of the general formula (XII),

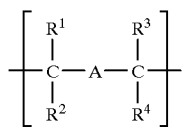

(XII)

wherein $R^1$, $R^2$, $R^3$, $R^4$ and A have the same meaning as in general formula (I).

Preferably the precursor polymer of the general formula (XII) has a molecular mass $M_w$ of more than $2 \cdot 10^6$, more preferably from $2 \cdot 10^6$ to $4 \cdot 10^6$.

Such a polymer is also an object of the invention.

Preferred polymers of the general formula (XII) are also those having recurring units of the general formula (XIIa)

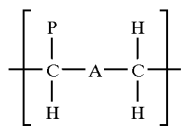

(XIIa)

wherein

P is —SO—R, SO$_2$—R,

R is a straight chain or branched $C_1$ to $C_{12}$ alkyl group, phenyl or benzyl, and A has the meaning given in formula (Ia).

Preferred polymers of the general formula (XIIa) have a molecular mass $M_w$ of more than $1 \cdot 10^5$, preferably more than $1 \cdot 10^6$, particularly preferrably from $1 \cdot 10^6$ to $4 \cdot 10^6$.

The polymers prepared by the novel process can, e.g., be used as intermediates for producing conjugated polymers, such as PPV.

Polymers of the general formula (Ia) which contain a group that can undergo 1,2-elimination can be further reacted to yield fully or partly conjugated polymers, such as poly(p-phenylene vinylene). Suitable groups for elimination include sulfoxides, sulfones, alcohols, alkoxides, ammonium salts, sulfonium salts and the like. Depending on the leaving group present in the precursor polymer the elimination can be carried out, e.g., by thermal treatment or/and under acidic or basic conditions, according to methods known from the literature (see for instance D. A. Halliday et al, Adv. Mater. 5, (1993) 40). The elimination can be carried out before and/or after processing depending on the solubility of the resulting conjugated polymer. For example, the elimination step of precursors of side group solubilized poly(p-phenylene vinylene) such as poly(2,5-dihexyloxy-p-phenylene vinylene), can be performed after processing, while poly(p-phenylene vinylene) has to be processed in the precursor state. The temperature range usually chosen for thermal elimination lies between 80 to 300° C. and depends on the nature of the aromatic units, the substituents on the aromatic units, the nature of the eliminating groups and experimental conditions, e.g., quality of an applied vacuum, neutral, acidic or basic environment.

By employing the polymers of the inventive process conjugated polymers with high molecular weights are obtainable.

Preferred conjugated polymers that are obtained by the novel process are those having repeating units of the general formula (XIII)

[—A—CH=CH—]          (XIII)

wherein

A has the meaning given in formula (Ia).

Preferably polymers of the general formula (XIII) have a molecular weight of more than $2 \cdot 10^6$, more preferred $2 \cdot 10^6$ to $4 \cdot 10^6$.

Such polymers are also an object of the invention.

A further object of the invention is a process for producing conjugated polymers comprising a) reacting a compound of the general formula (Ib)

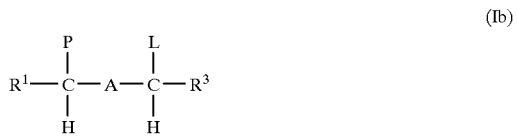

(Ib)

wherein

A, L, $R^1$ and $R^3$ have the meaning given in formula (Ia),

P is —SR$^5$, —OR$^5$, OH, —Cl, —Br, —SO—R$^5$, —SO$_2$—R$^5$, CN or —CO—OR$^5$, and R$^5$ is a straight chain or branched $C_1$ to $C_{12}$ alkyl, phenyl or benzyl, and a base in a solvent comprising a compound selected from the group consisting of a) amides of the general formula (II)

R$^1$—CO—NR$^2$R$^3$          (II)

b) urea derivatives of the general formula (III)

R$^1$R$^3$N—CO—NR$^2$R$^4$          (III)

c) carbonates of the general formula (IV)

$$R^1\text{—}CO\text{—}OR^2 \tag{IV}$$

d) nitroalkanes of the general formula (V)

$$R^6\text{—}NO_2 \tag{V}$$

e) nitrites of the general formula (VI)

$$R^6\text{—}CN \tag{VI}$$

f) amines of the general formula (VII)

$$R^5{}_2\text{—}N\text{—}R^6 \tag{VII}$$

g) sulfones of the general formula (VIII)

$$R6\text{—}SO_2\text{—}R^6 \tag{VIII}$$

h) sulfoxides of the general formula (IX)

$$R^6\text{—}SO\text{—}R^6 \tag{IX}$$

i) phosphoramides of the general formula (X)

$$((R^6)_2)N)_3\text{—}P\text{=}O \tag{X}$$

j) sulfonates of the general formula (XI)

$$R^6\text{—}SO_2\text{—}O\text{—}R^6 \tag{XI}$$

in which formulae (II) to (XI)

$R^1$, $R^2$, $R^3$ and $R^4$ denote, independently of each other, H or a straight chain or branched alkyl group, or $R^1$ and $R^2$ together are —$(CH_2)_2$—, —$(CH_2)_3$—or—$(CH_2)_4$—, and $R^5$ has the meaning of $R^1$ or is a phenyl group which is unsubstituted or substituted by halogen, methyl and methoxy groups, $R^6$ has the meaning of $R^5$, except H.

whereupon a polymer is formed, which is essentially soluble in said solvent, and a solid by-product is formed, which is essentially insoluble in said solvent, b) optionally isolating said polymer, and c) treating said polymer under conditions effecting elimination of H-P (P having the meaning given in formula (Ib)), thus forming a conjugated polymer.

Conjugated in the sense of the invention does not necessarily mean that the polymer is fully conjugated; however, substantial parts of the polymer have to be conjugated.

Conjugated polymers prepared according to the invention can be used as electroluminescent layers and/or charge transport layers in electroluminescent devices (e.g., WO 90/13148 and EP-A-0 443 861). The polymers can also be used, after doping, for conductive polymer applications, e.g., antistatic surfaces and electromagnetic shielding. Further, the polymers are useful for high temperature applications, e.g., thermally stable coatings.

The invention is illustrated but not limited by the examples which follow.

EXAMPLES

A. Starting Materials

α,α'-Dichloro-p-xylene, thiophenol, n-butanethiol, dichloromethane and potassium tert.-butoxid were used as purchased from Janssen Chimica. Sodium hydride, stabilized as an emulsion in higher alkanes, was purified by washing with n-hexane and dried under vacuum. Tetrahydrofuran (THF), N-methyl-pyrrolidone (NMP) and N-methylformamide (MMF) were dried and purified as described in the literature.

B. Monomer Synthesis

Example 1

α-Chloro-α'-phenylsulfinyl-p-xylene (1a)

In a 250 ml dropping funnel 3.8 ml (0.0378 mol) thiophenol was dissolved in 100 ml dry THF and 0.91 g (0.0378 mol) NaH was slowly added. Sodium thiophenolate formed a suspension in the THF. This suspension was added dropwise at 25° C. and under vigorous stirring to 33.08 g (0.189 mol) α,α'-dichloro -p-xylene dissolved in 150 ml THF. The reaction mixture was allowed to stand overnight, after which 100 ml water was added. The sulfide and the excess α,α'-dichloro-p-xylene were extracted with 4×50 ml $CHCl_3$. The organic layer was dried over $MgSO_4$. After filtration, the solvent was evaporated and the resulting crude material was used in the following oxidation step.

In a 1 l flask the excess α,α'-dichloro-p-xylene, the synthesized α-chloro-α'-phenylsulfide -p-xylene (theor. 0.037 mol) and 0.6 g ($3.7 \cdot 10^{-4}$ mol) $TeO_2$ were dissolved in 450 ml MeOH. 8.60 ml (0.076 mol) $H_2O_2$ (30 wt%) was added dropwise to the well-stirred solution. After 4 hours 100 ml water was added. The aqueous layer was extracted with $CHCl_3$, and the extract was dried over $MgSO_4$ and evaporated. (1a) was separated from α,α'-dichloro-p-xylene by use of a silica column (1 g crude product on 10 g silica, with $CHCl_3$ as an eluent). After recrystallization from hexane/toluene, bright white crystals were obtained. Yield: 5.5 g (55%)

Example 2

α-Chloro-α'-phenylsulfonyl-p-xylene (1b)

27.61 g (0.104 mol) (1a) was dissolved in 400 ml $CH_2Cl_2$. This solution was added dropwise to an ice-cooled solution of 36.03 g (0.208 mol) 3-chloroperbenzoic acid in 600 ml $CH_2Cl_2$ and 33.61 g (0.375 mol) $NaHCO_3$ in 200 ml $H_2O$. After the addition of (1a) the mixture was allowed to warm up to room temperature, and this was followed by another 2 hours' stirring. The reaction mixture was then poured into 500 ml 5% $Na_2CO_3$ solution. The organic layer was washed with 500 ml 5% $Na_2S_2O_3$ solution. The $CH_2Cl_2$ was dried over $MgSO_4$ and evaporated. The precipitate was purified by recrystallization from hexane/toluene. Yield: 26.65 g (91%); m.p.=170.3–170.9° C. (dec.)

Example 3

α-Chloro-α'-n-butylsulfinyl-p-xylene (1c)

A mixture of 99.7 g (0.57 mol) α,α'-dichloro-p-xylene in 1000 ml toluene (benzene), 60 g NaOH (1.5 mol) in 1000 ml $H_2O$ and 2.5 g of a phase transfer catalyst Aliquat 336 was stirred vigorously at ambient temperature. To this mixture a solution of 30.5 ml butanethiol (0.285 mol) in 300 ml toluene (benzene) was added dropwise over a period of 24 hours. The mixture was stirred for another 2 hours. The organic layer was separated off, washed with water, dried over $MgSO_4$, filtered and evaporated on a rotary evaporator to give whitish-yellow crystals. The crystals (a mixture of α,α'-dichloro-p-xylene and α-chloro -α'-n-butylsulfide-p-xylene) were dried to constant weight under vacuum. This crude material was used without further purification in the following oxidation step.

4.614 g of a catalyst, $TeO_2$, ($2.891 \cdot 10^{-2}$ mol) was added to a solution of the crude material in 1200 ml of MeOH. 64.66 ml (0.5702 mol) of a hydrogen peroxide solution (35 wt% solution in water) was added dropwise under nitrogen, with vigorous stirring. The reaction mixture was stirred vigorously at room temperature until a slight over-oxidation was detectable by thin layer chromatography. The reaction was quenched by adding 800 ml of a saturated NaCl solution. The water layer was extracted once with 600 ml $CHCl_3$ and 2 twice with 400 ml $CHCl_3$. The combined $CHCl_3$ layers were dried over $MgSO_4$, filtered and evaporated on a rotary evaporator to give white crystals (a mixture of α,α'-dichloro-p-xylene and α-chloro-α'-n-butylsulfinyl-p-xylene). The two products were separated by column chromatography (silica/$CHCl_3$). α,α'-Dichloro -p-xylene can be reused after recrystallization from toluene. α-Chloro-α'-n -butylsulfinyl-p-xylene was recrystallized from a mixture of hexane/$CH_2Cl_2$, washed with ice cold diethyl ether and dried under vacuum. Yield: 53.7 g (77%) of white crystals; m.p. 111.9–113.0° C.

Example 4
α-Chloro-α'-n-butylsulfonyl-p-xylene (1d)

A mixture of 42 g 3-chloroperoxybenzoic acid (0.134 mol; 50–60%, stabilized with 3-chlorobenzoic acid and water) in 500 ml $CH_2Cl_2$ and 50.25 g (0.598 mol) $NaHCO_3$ in 300 ml $H_2O$ was stirred vigorously and cooled to 0° C. A solution of 25 g (0.102 mol) α-chloro-α'-n-butylsulfinyl-p-xylene in 125 ml $CH_2Cl_2$ was added dropwise. The mixture was allowed to warm up to room temperature and was stirred for another 3 hours. The organic layer was separated off, washed with 1250 ml of a 5% $NaHCO_3$ solution, treated with 1250 ml of a 5% $Na_2S_2O_3$ solution and washed again with 1250 ml of a 5% $Na_2CO_3$ solution. The organic layer was dried over $MgSO_4$, filtered and evaporated on a rotary evaporator to give whitish-yellow crystals. The crystals were recrystallized from a mixture of hexane/$CH_2Cl_2$, washed with ice-cold diethyl ether and dried under vacuum. Yield: 23.4 g (88%) of white needles were obtained; m.p. 123.1–124.0° C.

C. Polymerization

Example 5
Polymerisation of α-chloro-α'-n-butylsulfonyl-p-xylene in N-methylformamide (MMF)

521 mg (1.998·$10^{-3}$ mol) of α-chloro-α'-n-butylsulfonyl-p-xylene were dissolved in 20 ml dry MMF and the solution was flushed with dry nitrogen under vigorous stirring for 2 hours. 225 mg (2.005·$10^{-3}$ mol) KOtBu was added. After 5 to 10 min the solution became turbid and a solid (KCl) precipitated. The polymerization was allowed to proceed at room temperature for 1 hour (still under a constant stream of nitrogen). Then the reaction mixture was poured into 200 ml $H_2O$ and neutralized with dilute HCl. The white precipitate was filtered off, washed thoroughly with water and dissolved in 50 ml $CHCl_3$. The organic layer was separated from residual $H_2O$ and concentrated on a rotary evaporator to 5 ml. The polymer was precipitated in 200 ml diethyl ether, filtered off and dried under vacuum. Yield: 121 mg (27%); molecular masses according to GPC (polystyrene standards):

$M_w=16.4·10^5$; $M_n=250·10^3$; $M_w/M_n^*=6.7$

*Monomodal dispersity

Example 6
Polymerization of α-chloro-α'-n-butylsulfonyl-p-xylene in MMF/$CH_2Cl_2$(80:20)

521 mg (1.998·$10^{-3}$ mol) of α-chloro-α'-n-butylsulfonyl-p-xylene were dissolved in a mixture of 16 ml dry MMF and 4 ml $CH_2Cl_2$. The solution was flushed for 2 hours with dry nitrogen under vigorous stirring. The nitrogen stream that left the flask was cooled with a mixture of dry ice/isopropanol to condense the evaporated $CH_2Cl_2$. 225 mg (2.005·$10^{-3}$ mol) KOtBu was added. After 5 to 10 min the solution became turbid and a solid (KCl) precipitated. The polymerization was allowed to proceed at room temperature for 1 hour. The solution was poured into 100 ml $CH_2Cl_2$, and washed 3 times with 50 ml slightly acidic water (pH=3 to 4) and 3 times with 100 ml water. The organic layer was concentrated on a rotary evaporator to 5 ml. The white polymer was precipitated in 200 ml diethyl ether, filtered off and dried under vacuum. Yield: 157 mg (35%); molecular masses according to GPC (polystyrene standards):

$M_w=21.0·10^5$; $M_n=510·10^3$; $M_w/M_n^*=4.1$

*Monomodal dispersity

Example 7
Polymerization of α-chloro-α'-n-butylsulfinyl-p-xylene in N-methylpyrrolidone (NMP)

1 g (4.08·$10^{-3}$ mol) of α-chloro-α'-n-butylsulfinyl-p-xylene was dissolved in 20.4 ml dry NMP. The solution was flushed with a stream of dry nitrogen under vigorous stirring for 1 hour. After cooling the polymerization vessel to −20° C., 98.0 mg (4.08·$10^{-3}$ mol) NaH was added all at once. After 5 to 10 min the solution became turbid and a solid (NaCl) precipitated. The polymerization was allowed to proceed for 1 hour. Then the mixture was poured into 200 ml ice-water and the aqueous solution was neutralized with dilute HCl. The precipitate was filtered off, washed with water and redissolved in $CHCl_3$. The $CHCl_3$ layer was dried, concentrated and added dropwise to 200 ml cold diethyl ether. The precipitate was filtered off, washed with diethyl ether and dried under vacuum at room temperature. To remove oligomers formed during polymerization the concentrated $CHCl_3$ layer can be added dropwise to a 10-fold excess of THF/diethyl ether (50:50). Yield: 306 mg (36%); molecular masses according to GPC (in NMP, polystyrene standards):

$M_w=300·10^3$; $M_n=70·10^3$; $M_w/M_n^*=4.3$

*Monomodal dispersity

Comparative Example 1
Polymerization of α-chloro-α'-n-butylsulfinyl-p-xylene in tetrahydrofurane (THF) with NaH 1 g (4.08·$10^{-3}$ mol) of α-chloro-α'-n-butylsulfinyl-p-xylene was dissolved in 50 ml dry THF. The solution was flushed with stream of dry nitrogen for 1 hour, under vigorous stirring. The nitrogen stream that left the flask was cooled with a mixture of dry ice/isopropanol to condense the evaporated THF. 98.0 mg (4.08·$10^{-3}$ mol) NaH was added all at once. After 1 hour, 2 hours, and 5 hours respectively, a sample (2.5 ml) of the polymerization mixture was poured into 25 ml ice-water. The precipitate was filtered off, washed with water and dried. GPC indicated that noticeable polymerization occurs only after 5 hours. After 24 hours the remaining reaction mixture was poured into 250 ml ice-water and the aqueous solution was neutralized with dilute HCl. The precipitate was filtered off, washed with water and redissolved in $CHCl_3$. The $CHCl_3$ layer was dried, concentrated and added dropwise to 200 ml cold diethyl ether. The precipitate was filtered off, washed with diethyl ether and dried under vacuum at room temperature. Yield: 202 mg (28%); molecular masses according to GPC (in NMP, polystyrene standards):

$M_w=22·10^3$; $M_n=5.2·10^3$; $M_w/M_n^*=4.2$

*Monomodal dispersity

Comparative Example 2
Polymerization of α-chloro-α'-n-butylsulfinyl-p-xylene in tetrahydrofurane (THF) with KOtBu 1 g (4.08·10$^{-3}$ mol) of α-chloro-α'-n-butylsulfinyl-p-xylene was dissolved in 50 ml dry THF. The solution was flushed with a stream of dry nitrogen for 1 hour, under vigorous stirring. The nitrogen stream that left the flask was cooled with a mixture of dry ice/isopropanol to condense the evaporated THF. 458.0 mg (4.08·10$^{-3}$ mol) KOtBu was added all at once. After 24 hours the reaction mixture was poured into 300 ml ice-water and the aqueous solution was neutralized with dilute HCl. The precipitate was filtered off, washed with water and redissolved in CHCl$_3$. The CHCl$_3$-layer was dried, concentrated and added dropwise to 200 ml cold diethyl ether. The precipitate was filtered off, washed with diethyl ether and dried under vacuum at room temperature. Yield: 212 mg (25%); molecular masses according to GPC (in NMP, polystyrene standards):

$M_w=16·10^3$; $M_n=5.0·10^3$; $M_w/M_n*=3.2$

*Monomodal dispersity

D. Polymer Conversion

Example 8
Conversion to poly(p-phenylene vinylene), PPV

The PPV-precursor polymer obtained as described in Example 7 was spin-cast from chloroform solutions to give a homogeneous, colorless and transparent film. The chloroform solution was easily filterable through a μm-filter. The film showed no yellowing when stored for several weeks in a normal atmosphere at room temperature. The precursor film was converted by thermal treatment (280° C./4 h/10$^{-5}$ mbar) to a homogeneous, yellow and transparent PPV-film, which was highly fluorescent (yellow-green). The infrared spectrum of the PPV-film accorded with those known from the literature (e.g., D. D. C. Bradley, J. Phys., Appl. Phys. 20, (1987) 1389).

We claim:
1. A process for producing polymers containing recurring units of the general formula (XII)

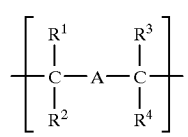
(XII)

wherein
R$^1$, R$^2$, R$^3$, R$^4$ are independently —H, —R$^5$, —OR$^5$, —COOR$^5$, NO$_2$, —NR$^5$R$^6$, —SR$^5$, CN, —SO—R$^5$, —SO$_2$—R$^5$, —L,
R$^5$ and R$^6$ are independently C$_1$–C$_{20}$ alkyl, phenyl, which can be mono- or disubstituted by R$^1$, or benzyl, or R$^5$ and R$^6$ together are —(CH$_2$)$_4$— or —(CH$_2$)$_5$—, and
A is p-phenylene, 2,6-naphthalenediyl, 1,4-naphthalenediyl, 1,4-anthracenediyl, 2,6-anthracenediyl, 9,10-anthracenediyl, 2,5-thienylene, 2,5-furanediyl, 2,5-pyrroldiyl, 1,3,4-oxadiazol-2,5-diyl, 1,3,4-thiadiazol-2,5-diyl, 1,3-benzofuranediyl, 1,3-benzopyrroldiyl, 1,3-benzothienylene, thienothiophene-2,5-diyl or pyrrolo-pyrrol-2,5-diyl in which H-atoms on the aromatic rings can be substituted by linear or branched hydrocarbon groups having 1 to 22 carbon atoms and linear or branched alkoxy groups having 1 to 22 carbon atoms, halogen atoms or cyano, nitro or ester groups, which comprises the steps of reacting
A) a precursor monomer of the general formula (Ia)

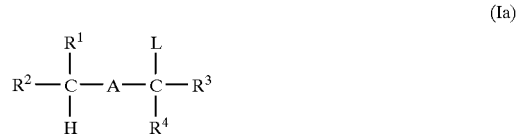
(Ia)

wherein
L is Cl, Br, I, —O—Tos, —O—Mes, —O—Triflate, —(NR$^5_3$)$^+$, —(SR$^5$R$^6$)$^+$ or —OOC—R$^5$,
and R$^1$, R$^2$, R$^3$, R$^4$, R$^5$, R$^6$ and A have the same meaning as in formula (XII), and
B) a base selected from the group consisting of metal bases, ammonium bases in the presence of uncharged bases, and
C) a solvent comprising a compound selected from the group consisting of
a) amides of the general formula (II)

(II)

b) urea derivatives of the general formula (III)

(III)

c) carbonates of the general formula (IV)

(IV)

d) nitroalkanes of the general formula (V)

(V)

e) nitriles of the general formula (VI)

(VI)

f) amines of the general formula (VII)

(VII)

g) sulfones of the general formula (VIII)

(VIII)

h) sulfoxides of the general formula (IX)

(IX)

i) phosphoramides of the general formula (X)

(X)

and
j) sulfonates of the general formula (XI)

(XI)

in which formulae (II) to (XI)
R$^1$, R$^2$, R$^3$, R$^4$ denote, independently of each other, H or a straight chain or branched alkyl group, or R$^1$ and R$^2$ together are —(CH$_2$)$_2$—, —(CH$_2$)$_3$— or —(CH$_2$)$_4$—, and
R$^5$ has the meaning of R$^1$ or is a phenyl group which is unsubstituted or substituted by halogen, methyl and methoxy groups,
R$^6$ has the meaning of R$^5$, except H, in such a way that a salt is formed in the reaction of the base with the precursor monomer which is essentially insoluble in the solvent, while the polymer comprising recurring units of the formula (XIII) is essentially soluble, in said solvent.

2. A process as claimed in claim 1, characterized in that the solvent comprises a compound of the formula (IIa), $$R^1\text{—CO—NHR}^2 \qquad (IIa)$$

wherein $R^1$ and $R^2$ have the same meaning as in formula (II) in claim 1.

3. A process as claimed in claim 1 or 2, being characterized in that a salt which is soluble in the solvent and which has the same cation as the base, is added to the reaction.

4. A polymer comprising recurring units of the general formula (XII)

$$\left[\begin{array}{c} R^1 \quad R^3 \\ | \quad\quad | \\ -C-A-C- \\ | \quad\quad | \\ R^2 \quad R^4 \end{array}\right] \qquad (XII)$$

wherein $R^1$, $R^2$, $R^3$ and $R^4$ have the same meaning as in formula (Ia) in claim 1, having a molecular weight $M_w$ of more than $2\cdot10^6$.

5. A polymer comprising recurring units of the general formula (XIIa)

$$\left[\begin{array}{c} P \quad H \\ | \quad | \\ -C-A-C- \\ | \quad | \\ H \quad H \end{array}\right] \qquad (XIIa)$$

wherein

P is —SO—$R^5$, $SO_2$—$R^5$, $SR^5$, $OR^5$, Cl, Br, CN or —CO—$OR^5$, $R^5$ is a straight chain or branched $C_1$ to $C_{12}$ alkyl group, phenyl or benzyl, and A has the meaning given in formula (Ia) in claim 1, having a molecular weight of more than $1\cdot10^5$.

6. An intermediate for producing electroluminescent materials which comprises a polymer obtained by a process as claimed in claim 1 or 2.

7. A process for producing conjugated polymers which comprises a) reacting a compound of the general formula (Ib)

$$R^1\underset{\underset{H}{|}}{\overset{\overset{P}{|}}{C}}-A-\underset{\underset{H}{|}}{\overset{\overset{L}{|}}{C}}-R^3 \qquad (Ib)$$

wherein

A, L, $R^1$ and $R^3$ have the meaning given in formula (Ia) in claim 1,

P is —$SR^5$, —$OR^5$, OH, —Cl, —Br, —SO—$R^5$, —$SO_2$—$R^5$, CN or —CO—$OR^5$, and $R^5$ is straight chain or branched $C_1$ to $C_{12}$ alkyl, phenyl, benzyl, and a base, in a solvent comprising a compound selected from the group consisting of a) amides of the general formula (II)

$$R^1\text{—CO—NR}^2R^3 \qquad (II)$$

b) urea derivatives of the general formula (III)

$$R^1R^3N\text{—CO—NR}^2R^4 \qquad (III)$$

c) carbonates of the general formula (IV)

$$R^1O\text{—CO—OR}^2 \qquad (IV)$$

d) nitroalkanes of the general formula (V)

$$R^6\text{—NO}_2 \qquad (V)$$

e) nitrites of the general formula (VI)

$$R^6\text{—CN} \qquad (VI)$$

f) amines of the general formula (VII)

$$R^5{}_2\text{—N—R}^6 \qquad (VII)$$

g) sulfones of the general formula (VIII)

$$R^6\text{—SO}_2\text{—R}^6 \qquad (VIII)$$

h) sulfoxides of the general formula (IX)

$$R^6\text{—SO—R}^6 \qquad (IX)$$

i) phosphoramides of the general formula (X)

$$((R^6)_2)N)_3\text{—P=O} \qquad (X)$$

and j) sulfonates of the general formula (XI)

$$R^6\text{—SO}_2\text{—O—R}^6 \qquad (XI)$$

in which formulae (II) to (XI)

$R^1, R^2, R^3$ and $R^4$ denote, independently of each other, H, a straight chain or branched alkyl group, or $R^1$ and $R^2$ together are —$(CH_2)_2$—, —$(CH_2)_3$— or —$(CH_2)_4$—, and $R^5$ has the meaning of $R^1$ or is a phenyl group or a phenyl group substituted by halogen, methyl and methoxy groups, $R^6$ has the meaning of $R^5$, except H, whereupon a polymer is formed, which is essentially soluble in said solvent, and a solid by-product is formed, which is essentially insoluble in said solvent, b) optionally isolating said polymer, and c) treating said polymer under conditions effecting elimination of HP (P having the meaning given in formula (Ib)), thus forming a conjugated polymer.

8. A polymer comprising repeating units of the general formula (XIII), $$[\text{—A—CH=CH—}] \qquad (XIII)$$

wherein

A has the meaning given in formula (Ia) in claim 1, having a molecular mass $M_w$ of more than $2\cdot10^6$.

9. Electroluminescent device, comprising a polymer obtained by a process as claimed in claim 7 or a polymer as claimed in claim 8.

* * * * *